US010789360B2

(12) United States Patent
Johns

(10) Patent No.: US 10,789,360 B2
(45) Date of Patent: Sep. 29, 2020

(54) PROTECTION AGAINST THIRD PARTY JAVASCRIPT VULNERABILITIES

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 15/880,398

(22) Filed: Jan. 25, 2018

(65) Prior Publication Data
US 2019/0228150 A1    Jul. 25, 2019

(51) Int. Cl.
| | |
|---|---|
| *G06F 21/56* | (2013.01) |
| *H04L 29/06* | (2006.01) |
| *G06F 21/54* | (2013.01) |
| *G06F 16/93* | (2019.01) |
| *G06F 21/51* | (2013.01) |
| *G06F 16/10* | (2019.01) |

(52) U.S. Cl.
CPC ............ *G06F 21/563* (2013.01); *G06F 16/93* (2019.01); *G06F 21/51* (2013.01); *G06F 21/54* (2013.01); *G06F 21/568* (2013.01); *H04L 63/101* (2013.01); *G06F 16/10* (2019.01)

(58) Field of Classification Search
CPC ...... G06F 21/568; G06F 16/10; G06F 21/563; G06F 16/93; G06F 21/51; H04L 63/101
USPC .......................................................... 726/25
See application file for complete search history.

(56) References Cited

U.S. PATENT DOCUMENTS

| | | |
|---|---|---|
| 2008/0313648 A1 | 12/2008 | Wang et al. |
| 2013/0276136 A1 | 10/2013 | Goodwin et al. |
| 2014/0164910 A1* | 6/2014 | Leue ..................... G06F 17/227 715/236 |

(Continued)

OTHER PUBLICATIONS

Nick Nikiforakis, et al., You Are What You Include: Large-scale Evaluation of Remote JavaScript Inclusions. In 19th ACM Conference on Computer and Communications Security, CCS'12, Oct. 16-18, 2012, 12 pages, Raleigh, North Carolina, USA.

(Continued)

*Primary Examiner* — Shanto Abedin
*Assistant Examiner* — Kalu Kelly Emeaba
(74) *Attorney, Agent, or Firm* — Fountainhead Law Group P.C.

(57) ABSTRACT

Embodiments protect against security vulnerabilities arising from $3^{rd}$ party JavaScript code. A browser receives from a server, a document including a first JavaScript. The browser in turn references a list stored in a database to recognize the first JavaScript as originating from other than the server. This recognition process may involve obtaining a stacktrace. The browser then references a second JavaScript in order to instrument a document object model (DOM) feature (e.g., global API, DOM element-attached API, DOM node property) to sanitize the first JavaScript. For instrumenting a global API, this may comprise overwriting a global reference in the first JavaScript with a replacement reference to a sanitization function. For instrumenting the DOM element-attached API or the DOM node property, the instrumenting may comprise altering a prototype of the DOM node element. The browser causes the DOM feature to sanitize the first JavaScript, and passes a sanitized JavaScript for execution.

19 Claims, 13 Drawing Sheets

(56) References Cited

U.S. PATENT DOCUMENTS

| | | | | |
|---|---|---|---|---|
| 2014/0245253 A1* | 8/2014 | Goldfeder | ................. | G06F 8/00 717/100 |
| 2015/0007251 A1* | 1/2015 | Johns | ...................... | H04L 63/20 726/1 |
| 2015/0341385 A1* | 11/2015 | Sivan | ................... | H04L 63/1466 726/23 |
| 2015/0373042 A1* | 12/2015 | Tripp | ................... | H04L 63/1433 726/1 |
| 2018/0012250 A1* | 1/2018 | Malca | .................... | G06F 17/218 |

OTHER PUBLICATIONS

Ben Stock, et al., From Facepalm to Brain Bender: Exploring Client-Side Cross-Site Scripting. In 22th ACM Conference on Computer and Communications Security (ACM CCS'15), Oct. 12-16, 2015, 12 pages, Denver, Colorado, USA.

Amit Klein. Dom based cross site scripting or xss of the third kind. Web Application Security Consortium, Articles, Jul. 4, 2005. 12 pages.

W3C. Same Origin Policy. [online], http://www.w3.org/Security/wiki/ Same_Origin_Policy, last accessed Aug. 1, 2012, Jan. 2010.

Sooel Son et al., The Postman Always Rings Twice: Attacking and Defending postMessage in HTML5 Websites. In Network and Distributed System Security Symposium (NDSS'13), 2013. 14 pages, Austin, TX, USA.

Sebastian Lekies et al., Lightweight Integrity Protection for Web Storage Content Caching. In 6th Workshop on Web 2.0 Security and Privacy (W2SP 2012), May 2012. 8 pages.

Sebastian Lekies, et al., 25 Million Flows Later-Large-scale Detection of DOM-based XSS. In Proceedings of the 20th ACM Conference on Computer and Communication Security (CCS '13), Nov 4-8, 2013., 12 pages, Berlin, Germany.

Ben Stock, et al., Precise Client-side Protection against DOM-based Cross-Site Scripting. In 23rd USENIX Security Symposium (USENIX Security '14), Aug. 20-22, 2014. 17 pages, San Diego, CA, USA.

Inian Parameshwaran, et al., Auto-patching dom-based xss at scale. In Proceedings of the 2015 10th Joint Meeting on Foundations of Software Engineering, pp. 272-283, New York, NY, USA, 2015. ACM.

Daniel Bates, et al., Regular expressions considered harmful in client-side xss filters. In Proceedings of the 19th inter-national conference on World wide web, pp. 91-100. ACM, 2010., Raleigh, North Carolina, USA.

Riccardo Pelizzi et al., usability and improvements in reflected xss filters. In Asia CCS, May 2-4, 2012. 11 pages, Seoul, Korea.

Giorgio Maone. NoScript Firefox Extension. [software], http://www.noscript.net/whats, 2006.

David Ross. IE 8 XSS Filter Architecture / Implementation. [online], http://blogs.technet.com/b/srd/archive/2008/08/19/ie-8-xss-filter-architecture-implementation.aspx, Aug. 2008.

Raymond Mui et al.,Preventing web application injections with complementary character coding. In Computer Security ESORICS 2011, 29 pages. Springer, 2011.

Omar Ismail, et al., A proposal and implementation of automatic detection/collection system for cross-site scripting vulnerability. In Advanced Information Networking and Applications, 2004. AINA 2004, 18th International Conference on, vol. 1, pp. 145-151, IEEE, Oct. 10-13, 2004, The Hague, Netherlands.

Yacin Nadji, et al. Document structure integrity: A robust basis for cross-site scripting defense. In NDSS, 2009., Feb. 8-11, 2009, 20 pages, San Diego, CA, USA.

Mike Ter Louw et al., Robust prevention of cross-site scripting attacks for existing browsers. In Security and Privacy, 2009 30th IEEE Symposium, May 17-20, 2009, pp. 331-346, IEEE, Berkeley, CA, USA.

Martin Johns. Sessionsafe: implementing xss immune session handling. In Proceedings of the 11th European conference on Research in Computer Security, ESORICS'06, pp. 2006. Springer-Verlag. Berlin, Heidelberg.

Ulfar Erlingsson, et al., End-to-end Web Application Security. In Proceedings of the 11th Workshop on Hot Topics in Operating Systems (HotOS'07), May 7-9, 2007, 6 pages, Berkeley, CA, USA.

Nick Nikiforakis, et al., SessionShield: Lightweight Protection against Session Hijacking. In 3rd International Symposium on Engineering Secure Software and Systems (ESSoS '11), 14 pages, LNCS. Springer, Feb. 9-10, 2011, Madrid, Spain.

Engin Kirda, et al., A Client-Side Solution for Mitigating Cross Site Scripting Attacks. In Security Track of the 21st ACM Symposium on Applied Computing (SAC2006), Apr. 23-27, 2006., 8 pages, Dijon, France.

Internet article entitled "DOMPurify", retrieved from https://cure53.de/purify, printed May 25, 2018.

Internet article entitled :Window.postMessage( ), retrieved from https://developer.mozilla.org/en-US/docs/Web/API/Window/postMessage, printed May 25, 2018.

Internet article entitled :Window.localStorage, retrieved from https://developer.mozilla.org/en-US/docs/Web/API/Window/localStorage, printed May 25, 2018.

Internet article entitled :IndexedDB API, retrieved from https://developer.mozilla.org/en-US/docs/Web/API/IndexedDB_API, printed May 25, 2018.

Internet article entitled :MediaDevices.getUserMedia( ), retrieved from https://developer.mozilla.org/en-US/docs/Web/API/MediaDevices/getUserMedia, printed May 25, 2018.

Heiderich et al, "DOMPurify: Client-Side Protection Against XSS and Markup Injection" ESORICS 2017; Aug. 12, 2017, pp. 116-134.

European Search Report, Application No. 18176324.4, dated Feb. 121, 2019,8 pages.

* cited by examiner

```
1  <!-- HTML code delivered from https://a.com -->
2  <head>
3      <script src="https://b.com/service.js"></script>
4  </head>
```

FIG. 3

```
1  var element = document.querySelector("#container");
2  element.innerHTML = "<div>Hello World!</div>";
```

FIG. 4

| Property | Argument | Browser |
|---|---|---|
| HTMLElement.innerHTML | assigned value | all |
| HTMLElement.outerHTML | assigned value | all |
| HTMLButton.value | assigned value | Internet Explorer |
| API | Argument | Browser |
| HTMLElement.insertAdjacentHTML | second | all |
| Range.createContextualFragment | first | all |

FIG. 5

| API | Argument | Browser |
|---|---|---|
| eval | first | all |
| Function | last | all |
| setTimeout | first | all |
| setInterval | first | all |
| setImmediate | first | IE 10+ |
| execScript | first | IE 6+ |
| crypto.generateCRMFRequest | 5th | Firefox 2 |

| Property | Argument | Browser |
|---|---|---|
| ScriptElement.src | assignedValue | all |
| ScriptElement.text | assignedValue | IE |
| ScriptElement.textContent | assignedValue | all |
| ScriptElement.innerText | assignedValue | all but Firefox |
| HTMLTag.on*EventName* | assignedValue | all |

FIG. 6

```
1   (function () {
2     // Preserve link to original implementation
3     var orgWrite = document.write;
4
5     // overwrite global API reference with our implementation
6     document.write = function(val){
7
8       // Conditional sanitization
9       var safeVal = sanitize(val);
10
11      // Call original functionality
12      orgWrite(safeVal);
13    };
14  })();
```

FIG. 8

```
1  (function () {
2      // Preserve link to original implementation
3      var orgFun = Element.prototype.insertAdjacentElement;
4
5      // overwrite prototype API reference with our implementation
6      Element.prototype.insertAdjacentElement = function(pos, val){
7
8          // Conditional sanitization
9          var safeVal = sanitize(val);
10
11         // Call original functionality
12         var args = [pos, safeVal];
13         orgFun.apply(this, args);
14     };
15 })();
```

FIG. 9

```
1  (function () {
2    var oldSet = Object.getOwnPropertyDescriptor(Element.prototype,
   ↪ 'innerHTML').set;
3
4    (function redefineInnerHTML() {
5      Object.defineProperty(Element.prototype, "innerHTML", {
6        set: function (val) {
7          Object.defineProperty(Element.prototype, "innerHTML", {
8            set: oldSet
9          });
10
11         // Conditional sanitization
12         this.innerHTML = sanitize(val);
13
14         redefineInnerHTML();
15       }
16     });
17   })();
18 })();
```

FIG. 10

```
1  (function () {
2    // Preserve link to original implementation
3    var orgWrite = document.write;
4
5    // overwrite global API reference with our implementation
6    document.unsafeWrite = function(val){
7
8    // Call original functionality
9    orgWrite(safeVal);
10   };
11 })();
```

FIG. 11

```
1  (function () {
2    var oldSet = Object.getOwnPropertyDescriptor(Element.prototype,
   ↪  'innerHTML').set;
3
4    Object.defineProperty(Element.prototype, "unsafeInnerHTML", {
5      set: oldSet
6    });
7  })();
```

FIG. 12

```
1  function getStacktrace(){
2      var err = new Error();
3      var stacktrace = err.stack;
4      return stacktrace;
5  }
```

FIG. 13

```
1  var stacktrace = getStacktrace();
2  var funName = getTopFunction(stacktrace);
3  if (!funName.startsWith("sap.")){
4      Sanitizer.sanitize(val);
5  }
6  processValue(val);
```

FIG. 14

```
1  var whitelist = getWhitelist();
     // returns dictionary with functionnames {"fun1": true, "fun2": true, ...}
2  var stacktrace = getStacktrace();
3  var funName = getTopFunction(stacktrace);
4  if (!whitelist[funName.startsWith]){
5      Sanitizer.sanitize(val);
6  }
7  processValue(val);
```

FIG. 15

```
1  <head>
2      <script src="/lib/sanitizer.js"></script>
3      <script src="/lib/scriptprotector.js"></script>
4  </head>
```

FIG. 16

PROTECTION AGAINST THIRD PARTY JAVASCRIPT VULNERABILITIES

BACKGROUND

Unless otherwise indicated herein, the approaches described in this section are not prior art to the claims in this application and are not admitted to be prior art by inclusion in this section.

Modern web applications frequently make use of 3rd party JavaScript to add additional services and features to the application's client-side functionality. This code is directly imported into the application's client-side from the third party server of the script providers. Thus the application provider utilizing such third party scripts has no influence over the content, quality, or security of those scripts.

Cross-Site Scripting (XSS) is a class of code-injection security vulnerability in the browser. Web applications run in a protected environment, such that only code from the same origin as the application can interact with it. Therefore, the goal of an XSS attacker is to execute arbitrary JavaScript code in the victim's browser, in the context (origin) of the vulnerable web page. If successful, this allows the attacker to conduct any action in the name of the victimized user. For example the attacker may impersonate the user of the application and/or retrieve secret information such as cookies.

SUMMARY

Embodiments relate to systems and methods implementing protection against security vulnerabilities (e.g., XSS) arising from JavaScript code that originates from third parties. In particular, a browser receives from a server, a document including a first JavaScript. The browser in turn references a list (e.g., whitelist or blacklist) stored in a database to recognize the first JavaScript as originating from a third party other than the server. According to certain embodiments this recognition process involves obtaining a stacktrace. The browser then references a second JavaScript in order to instrument a document object model (DOM) feature (e.g., a global API, a DOM element-attached API, or a DOM node property) in order to sanitize the first JavaScript. For instrumenting a global API, this may comprise overwriting a global reference in the first JavaScript with a replacement reference to a sanitization function. For instrumenting the DOM element-attached API or the DOM node property, the instrumenting may comprise altering a prototype of the DOM node element. The browser causes the DOM feature to sanitize the first JavaScript, and passes a sanitized JavaScript for execution.

An embodiment of a computer-implemented method comprises a browser receiving from a server, a document including a first JavaScript. The browser references a list stored in a database to recognize the first JavaScript as originating from other than the server. The browser references a second JavaScript to instrument a document object model (DOM) feature to sanitize the first JavaScript. The browser causes the DOM feature to sanitize the first JavaScript. The browser passes a sanitized JavaScript to the document for execution.

A non-transitory computer readable storage medium embodies a computer program for performing comprising a browser receiving from a server, a document including a first JavaScript. The browser references a list stored in a database to recognize the first JavaScript as originating from other than the server by obtaining a stacktrace. The browser references a second JavaScript to instrument a document object model (DOM) feature to sanitize the first JavaScript. The browser causes the DOM feature to sanitize the first JavaScript, and the browser passes a sanitized JavaScript to the document for execution.

An embodiment of a computer system comprises one or more processors and a software program. The software program is executable on said computer system and configured to cause an in-memory database engine to cause a browser to receive from a server, a document including a first JavaScript. The software program causes the browser to reference a list stored in an in-memory database to recognize the first JavaScript as originating from other than the server. The software program causes the browser to reference a second JavaScript to instrument a document object model (DOM) feature to sanitize the first JavaScript. The software program causes the browser to cause the DOM feature to sanitize the first JavaScript, and causes the browser to pass a sanitized JavaScript to the document for execution.

According to some embodiments the DOM feature comprises an application program interface (API).

In certain embodiments the API comprises a global API and the instrumenting comprises, before calling an original functionality of the first JavaScript, overwriting a global reference in the first JavaScript with a replacement reference to a sanitization function.

Various embodiments further comprise the browser adding another reference to the global API.

According to particular embodiments the API comprises a local API attached to a DOM node element, and the instrumenting comprises altering a prototype of the DOM node element.

In some embodiments the DOM feature comprises a property of a DOM node element, and the instrumenting comprises altering a prototype of the DOM node element.

Certain embodiments further comprise the browser adding properties to the prototype.

Particular embodiments further comprise the browser temporarily restoring the prototype to its original state, assigning an original functionality to the DOM node element, and then reinstrumenting the DOM feature to sanitize the first JavaScript.

Various embodiments further comprise the browser obtaining a stacktrace to recognize the first JavaScript as originating from other than the server.

According to some embodiments the list comprises a whitelist.

The following detailed description and accompanying drawings provide a better understanding of the nature and advantages of embodiments.

BRIEF DESCRIPTION OF THE DRAWINGS

FIG. 3 is a code listing illustrating an example of remote JavaScript inclusion.

FIG. 4 is a code listing illustrating an innerHTML example.

FIG. 5 is a table of runtime creation of DOM content.

FIG. 6 is a table showing dynamic creation of JavaScript code according to an embodiment.

FIG. 8 is a code listing showing transparent instrumentation of global APIs.

FIG. 9 is a code listing showing transparent instrumentation of element-local APIs.

FIG. 10 is a code listing showing transparent instrumentation of JavaScript's innerHTML property affecting the whole document.

FIG. 11 is a code listing showing an unsafe global API variant.

FIG. 12 is a code listing showing introduction of an unsafe innerHTML property variant.

FIG. 13 is a code listing illustrating the getting the current stacktrace.

FIG. 14 is a code listing of pre-fix whitelisting of SAP UI5 functions.

FIG. 15 is a code listing of whitelisting functions.

FIG. 16 is a code listing illustrating deployment of an embodiment.

DETAILED DESCRIPTION

Figure 1:
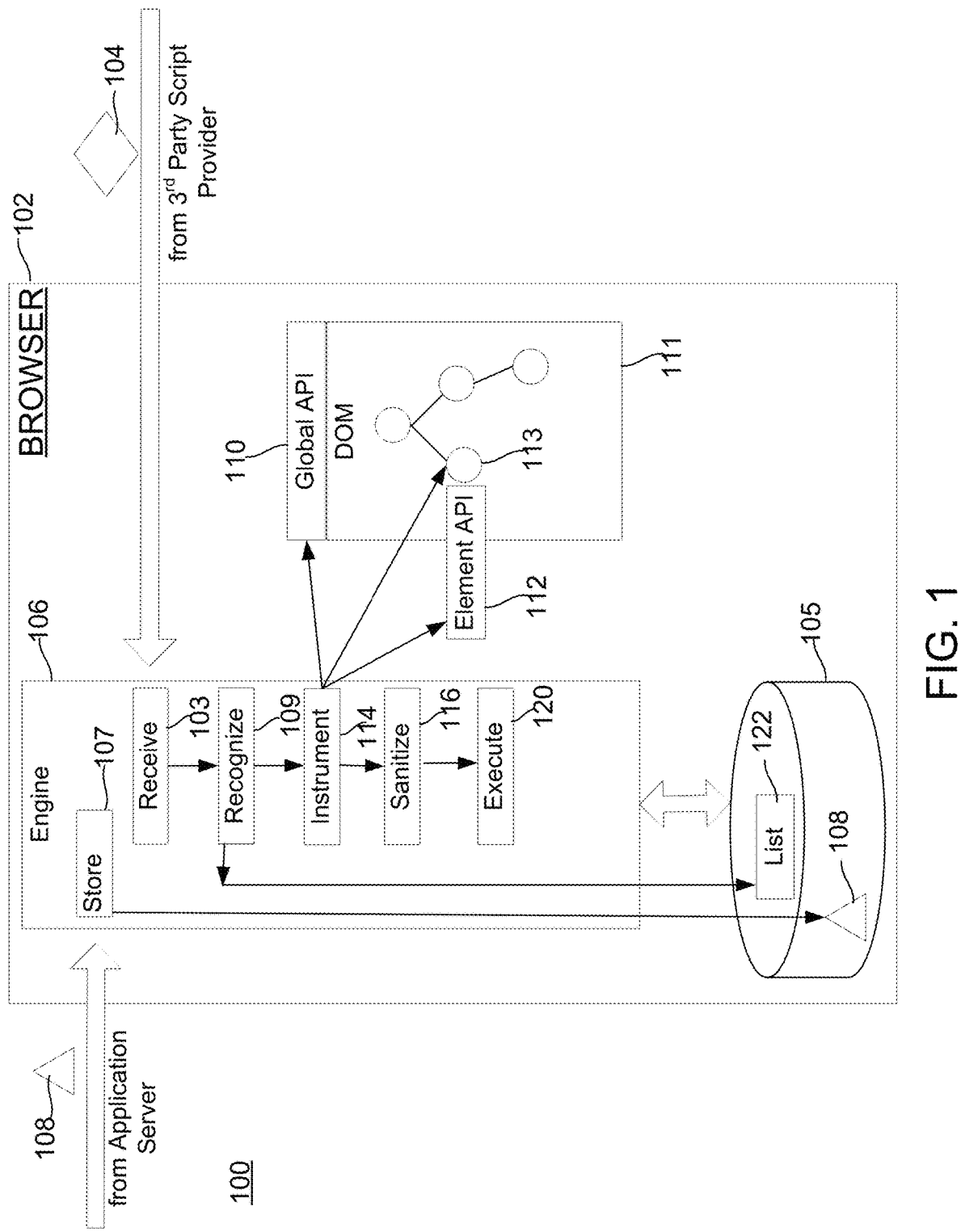
FIG. 1 shows a simplified diagram of a system according to an embodiment.

Described herein are methods and apparatuses implementing protection against third party JavaScript security vulnerabilities. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

From a conceptual standpoint, a XSS vulnerability arises when an unfiltered data flow occurs from an attacker-controlled source to a security-sensitive sink. In the concrete case of client-side XSS, such a source can be the URL, whereas an example for a sink is "eval" or "document-.write". Both of these APIs accept strings as parameters, which are subsequently parsed and executed as code (JavaScript and HTML, respectively). Therefore, passing attacker-controllable input to such functions eventually leads to execution of the attacker-provided code.

The role of 3rd party JavaScript providers is now discussed. HTML's script-tag allows the direct reference and subsequent inclusion of remote JavaScript files. FIG. 3 is a code listing illustrating an example of remote JavaScript inclusion.

HTML tags are not subject to JavaScript's same-origin policy. Thus, such a tag causes the web browser to retrieve the JavaScript code from the 3rd party host and execute it immediately.

The JavaScript code is executed in the context of the hosting 1st party web document. Thus it inherits the origin of the hosting document (i.e., the JavaScript code runs in the same security context as the 1st party code.

Usage of 3rd party JavaScript is relatively common. Examples can arise in the context of web analytics, advertising, social networking, or inclusion of 3rd party services.

However, security vulnerabilities can be introduced through such reliance upon 3rd party JavaScript. As the 3rd party JavaScript code is executed in the web origin of the including site, all potential vulnerabilities in this code directly affect the including site. Thus, if 3rd party code causes a client-side vulnerability, the hosting site is vulnerable to XSS.

An overview of the classes of potentially problematic DOM APIs and properties is now described. These APIs and properties exist in at least the following three distinct forms.

First, global APIs are either attached to the document or window objects or part of the global namespace. An example of a global API is: eval(code).

Second, element-local APIs are attached to individual DOM nodes. An example of an element-local API is: node-.insertAdjacentHTML('afterend', '<b>!</b>').

Third are element-local DOM properties. These are properties of DOM nodes, which can be directly assigned. An example is: divElement.innerHTML="<i>?</i>".

The above APIs and properties can be divided into different classes of functionality. Problematic characteristics of each of these classes giving rise to security concerns, are now discussed.

One problematic characteristic is the direct creation of raw DOM content on rendering time. In particular, JavaScript offers a set of APIs that during script execution (e.g., initial rendering of the document) directly add additional HTML code to the document. That additional HTML code will be seamlessly interpreted after the script terminates, prior to the parsing/interpretation of subsequent HTML code.

The best known and most widely used API exhibiting this characteristic is: document.write. By passing an argument containing additional script HTML tags, JavaScript can use the API (in its unaltered form) to add further script code to the document. The following table offers an overview of APIs exhibiting this class of problematic functionality.

| API | Argument | Browser |
|---|---|---|
| document.write | first | all |
| document.writeln | first | all |

Another problematic characteristic from a security standpoint, is runtime creation of DOM content. In particular, some DOM APIs and properties allow the alteration of the DOM's HTML content at runtime (e.g., after the initial rendering process has terminated).

Unlike the first problematic functionality (e.g., document.write et al.) this second functionality is not provided as a global API. Instead, it is realized through a set of properties and APIs which are directly attached to HTML DOM elements. In this way, the relative location of the new HTML DOM content is provided implicitly.

One element in this class that is used is the innerHTML property. On assignment, the innerHTML inserts new HTML subtree-structures as a DOM child of the hosting HTML element.

FIG. 4 is a code listing illustrating an innerHTML example. An overview of the elements of this class of problematic functionality is given in the table of FIG. 5.

A third class of problematic functionality is dynamic code execution. Specifically, a set of APIs and DOM properties allow the direct conversion of string data into JavaScript code. A common representative of this problematic class is the function: eval. The table of FIG. 6 offers an overview of runtime creation of DOM content.

In view of the above issues, embodiments are directed to systems and methods that implement protection against security vulnerabilities (e.g., XSS) arising from JavaScript code that originates from third parties. In particular, a browser receives from a server, a document including a first JavaScript. The browser in turn references a list (e.g., whitelist or blacklist) stored in a database to recognize the first JavaScript as originating from a third party other than the server. According to certain embodiments this recognition process involves obtaining a stacktrace. The browser then references a second JavaScript in order to instrument a document object model (DOM) feature (e.g., a global API, a DOM element-attached API, or a DOM node property) in order to sanitize the first JavaScript. For instrumenting a global API, this may comprise overwriting a global reference in the first JavaScript with a replacement reference to a sanitization function. For instrumenting the DOM element-attached API or the DOM node property, the instrumenting may comprise altering a prototype of the DOM node element. The browser causes the DOM feature to sanitize the first JavaScript, and passes a sanitized JavaScript for execution.

FIG. 1 shows a simplified view of a system configured to protection against third party JavaScript vulnerabilities according to an embodiment. Specifically, system 100 comprises a browser 102 that is configured to receive 103 and interact with a document (e.g., an HTML document) that includes JavaScript 104.

As described above, the $3^{rd}$ party origin of script 104 can give rise to security issues. Accordingly, prior to interacting with the document, an engine 106 of the browser is configured to receive and store 107 in a non-transitory computer readable storage medium 105, a separate JavaScript 108 that is executable to recognize 109 potentially harmful third party scripts. The engine uses the stored separate stored JavaScript in order to sanitize the third party JavaScripts and remove the security threat.

In particular, potentially harmful browser APIs of a document object model 111 (including global APIs 110 and element-attached APIs 112) as well as DOM node properties 113 (e.g., document.write, innerHTML) which could give rise to vulnerabilities, are instrumented 114 on runtime. This is done through the separate script which is included early in the head portion of the hosting HTML document. Such instrumenting then allows the script sanitizing 116 to be performed as appropriate.

Regarding global DOM APIs, references to these are readily available after document initialization. Embodiments may preserve a link to the original implementation for future usage with sanitized values. Subsequently the system overwrites the global reference and replaces it with a reference to a function which first executes the sanitizing step, before calling the original functionality. This aspect is discussed more particularly in FIG. 8 of the example presented later below.

Regarding instrumentation of APIs directly attached to a DOM node, embodiments may leverage JavaScript's prototype-based object oriented features. Specifically, by altering an element's prototype, embodiments can transparently change the behavior of DOM nodes. This aspect is discussed more particularly in FIG. 9 of the example presented later below Regarding DOM properties, their set property may be replaced with the safe wrapper. As the DOM properties are attached to individual DOM nodes, the elements' prototype is changed in a manner similar to the element-local APIs. To temporarily restore the script's functionality, the prototype is temporarily restored to its original state, the property is assigned, and then the property's set function is quickly reinstrumented. This aspect is discussed more particularly in FIG. 10 of the example presented later below Finally, the engine passes a script to the API for execution 120. Depending on the applied policy—e.g., outcome of applying list 122 (e.g., whitelist or blacklist), the wrapper either sanitizes the script or passes it to the API unaltered.

Figure 2:
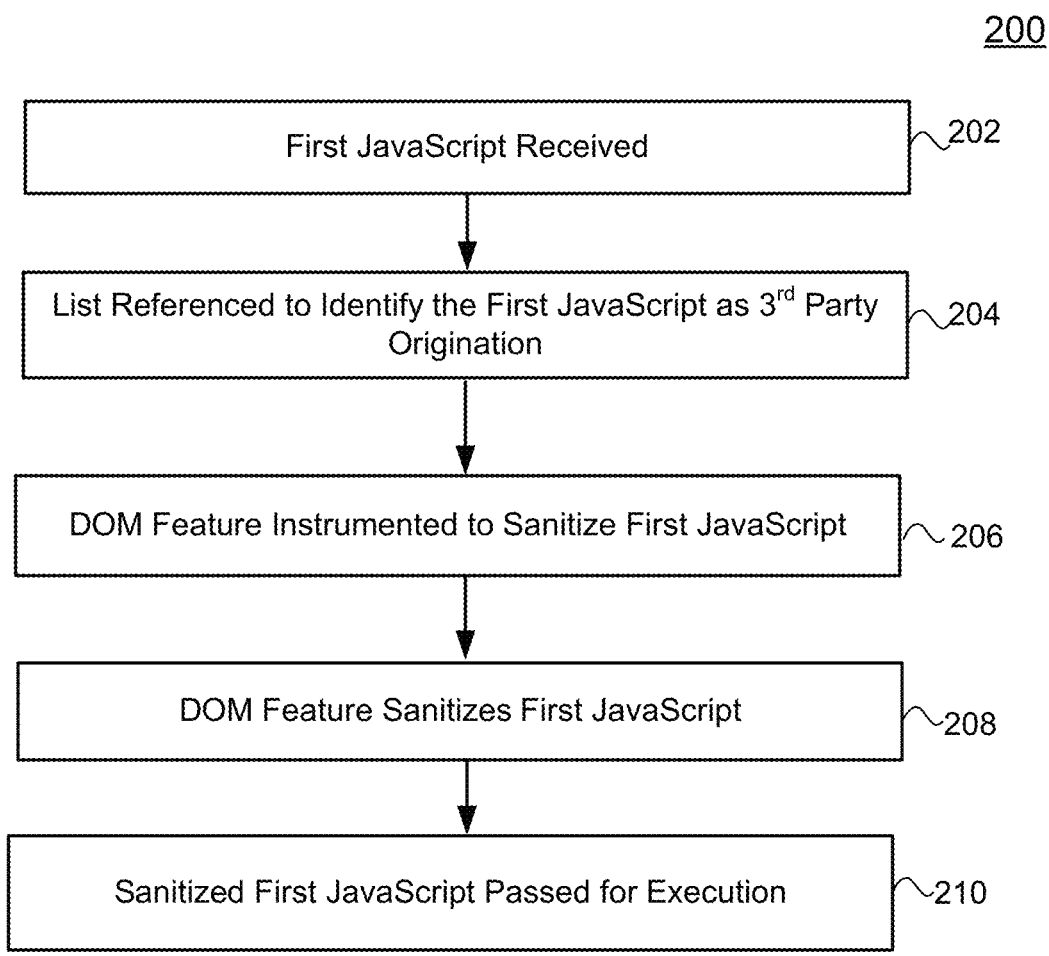
FIG. 2 shows a simplified flow diagram of a method according to an embodiment.

FIG. 2 is a flow diagram showing various actions taken in a method 200 according to an embodiment. At 202, a document including a first JavaScript is received by a browser from a server.

At 204 the browser references a list stored in a database to recognize the first JavaScript as a $3^{rd}$ party script originating from other than the server. At 206 the browser references a second JavaScript to instrument a document object model (DOM) feature to sanitize the first JavaScript.

At 208 the browser causes the DOM feature to sanitize the first JavaScript. At 210 the browser passes a sanitized JavaScript to the document for execution.

A concrete embodiment illustrating the implementation of protection against $3^{rd}$ party JavaScript security vulnerability in the form of XSS is presented in the Example below. Before reviewing that particular example, however, it is noted that other web browser APIs may be protected.

Specifically, in addition to APIs and DOM properties giving rise to client-side XSS problems, other classes of JavaScript APIs can also be protected. Examples of functionality giving rise to security concerns in such other API classes are now described.

A first example is cross-domain communication. The API: postMessage, allows communication within the web browser over the origin-boundaries set by the Same-origin Policy. Unsafe usage of that API could lead to leakage of confidential information. Thus in order to prevent 3rd party scripts from accidentally leaking information to untrusted sites, embodiments can restrict the API usage to trusted 1st party code.

A second example is client-side persistence. Several browser APIs (e.g., localStorage, IndexedDB) allow the persistent storage of information on the client's browser. Depending on the 1st party functionality, that storage might contain sensitive data.

Also, allowing 3rd parties to store information into 1st party's origin bound storage might lead to pollution of the application's data. This might also lead to second order injection vulnerabilities. Hence, depending on 1st party usage of these persistence methods, restricting 3rd party scripts according to embodiments could increase the robustness of the application's security.

A third example of problematic functionality is A/V Communication. With modern APIs (e.g., MediaDevices.getUserMedia), the web browser has access to the user's computer's camera and microphone. Permission to access these devices is obtained in the context of the web origin of the hosting web site (i.e., under the context of the 1st party application provider).

Here again, the 3rd party script is executed in the context of the 1st party web origin. If the user trusts the 1st party to access his A/V devices, the 3rd party is implicitly granted access as well. Thus embodiments allow denial of 3rd party scripts access to A/V resources, without disrupting legitimate 1st party functionality.

It is noted that the general protection mechanism and specific implementations, e.g., whitelisting, unsafe variants (specifically discussed in the Example below) remain the same.

Various details of implementing protection against third party JavaScript vulnerabilities according to particular embodiments, are now discussed in connection with the following example.

EXAMPLE

This example relates to implementing protection against $3^{rd}$ party JavaScript security issues in the form of XSS vulnerability. In this example, embodiments offering transparent protection against $3^{rd}$ party JavaScript vulnerabilities are also referred to as "ScriptProtect".

The instant example could be deployed in combination with products (cloud and on-premise) from SAP SE of Walldorf, Germany that use HTML/JavaScript based user interfaces. This includes the SAP cloud platform and UI5/Fiori-based applications.

In the context of this exemplary scenario, the 3rd party JavaScript is considered non-malicious but vulnerable. In particular, the initially executed JavaScript code has no intent to undermine the protection scheme.

The application provider (i.e., the owner of the 1st party code) utilizes the 3rd party JavaScript within the context of the application. Thus the script is directly included without additional measures into the web documents of the application using a cross-origin script HTML tag.

The attacker in this scenario is a malicious actor, who aims to exploit the client-side XSS problem. This has been unwillingly introduced by the 3rd party script.

Embodiments address the XSS vulnerability as follows. All potential harmful browser APIs and properties (e.g., document.write or innerHTML) potentially giving rise to 3rd party XSS vulnerabilities, are instrumented on runtime. This is done through a 1st party JavaScript included early in the head portion of the hosting HTML document.

Following execution of the ScriptProtect JavaScript, all instrumented APIs are secure-by-default. Thus all values passed to them are safely sanitized before the API's functionality is executed.

It is noted that the process of sanitizing XSS values for security purposes may be accomplished in a variety of ways. One practical implementation is to leverage the DOMPurify library for this purpose.

In this manner, through standard usage of these APIs and properties, it is impossible to introduce additional script content to the web page. To allow trusted 1st party code to still leverage the script-enabling functionality of the APIs, the following strategies can be used.

One strategy may be employed for new applications. The standard API remains unable to introduce new script content into the web document. However, ScriptProtect introduces a second version of the API (e.g., document.unsafeWrite) to be used explicitly by 1st party code in cases in which additional script code should be added to the document.

As these cases are in the minority, and through the explicit usage of the unsafe versions clearly marked, it is straightforward to audit such occurrences during development to avoid vulnerabilities. Details regarding this approach for new applications is given below.

A second strategy may be employed for existing applications. This second strategy involves stacktrace-based value treatment. Specifically, for an existing significant code base for the target application, ScriptProtect offers the option to dynamically adapt the behavior of the APIs and DOM properties, depending on the calling function.

According to this strategy, the mechanism transparently checks the stacktrace of the current execution threat. This produces the top-most execution context which caused the execution chain resulting in the potentially harmful operation.

If the call was originally initiated by a trusted 1st party functionality, the value is passed unaltered to the API/property. If the call came originally from a 3rd party script, the value is automatically sanitized so that no additional script content will be added to the web document. Further details regarding this dynamic behavior selection approach are also provided below.

Figure 7:
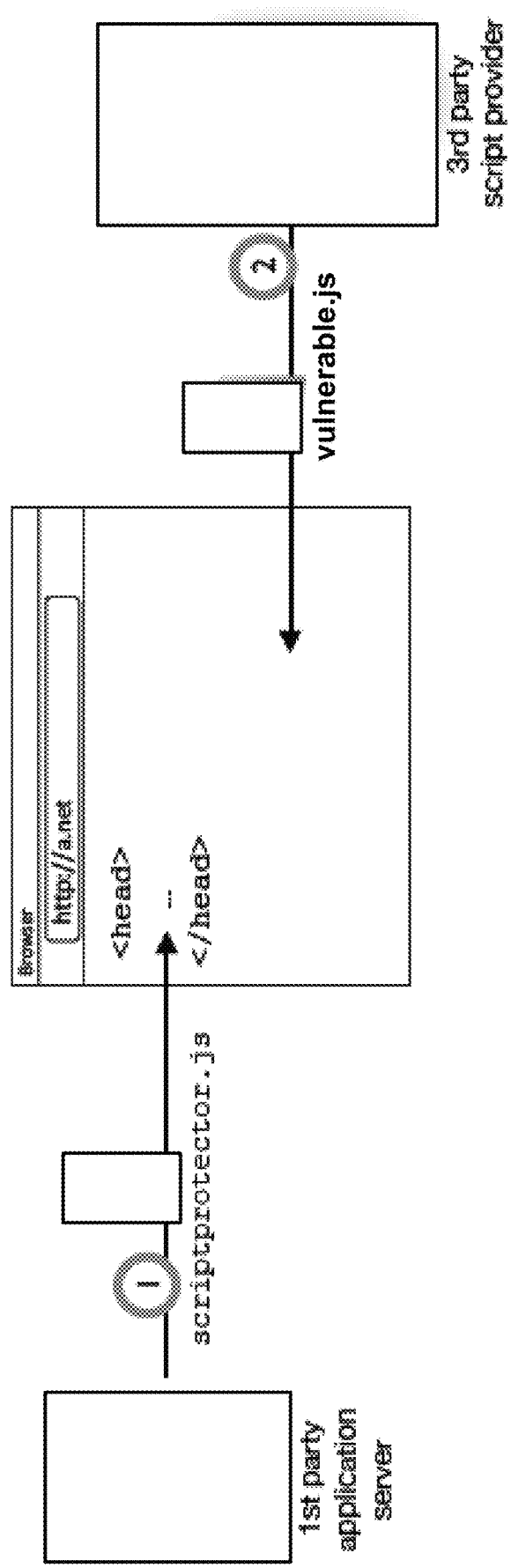
FIG. 7 presents an overview of an application and solution deployment scenario according to an embodiment.

FIG. 7 presents an overview on the application and solution deployment scenario for transparent and safe instrumentation of dangerous APIs and DOM properties according to embodiments. In particular, FIG. 7 shows ScriptProtect (scriptprotector.js) performing instrumentation to safely sanitize all values passed to DOM APIs and properties, before the API's or property's DOM altering functionality is executed.

Embodiments alter behavior in that normal usage of the APIs and properties is secure by default. As long as no other conditions are met (such as the existence of a whitelisted stacktrace, or the explicit calling of a newly introduced unsafe API/property variant) it is impossible to introduce further script content. In this manner the client-side XSS is eliminated from the ground up.

As previously mentioned above, the following three distinct classes of problematic DOM functionalities exist:
  global APIs,
  element-local APIs, and
  element-local properties.
Each of these problematic DOM functionalities involves a distinct instrumentation strategy.

For global DOM APIs, references to these are readily available after document initialization. The system first preserves a link to the original implementation for future usage with sanitized values.

FIG. 8 is a code listing showing an example of securing transparent instrumentation of the global API: document.write. The link is shown at line 3 in this listing.

Subsequently, the system overwrites the global reference and replaces it with a reference to a function which first executes the sanitizing step, before calling the original functionality.

In this manner, transparent instrumentation can be achieved. Preexisting code, which intends to call the original API, keeps functioning without any required code changes.

Security issues arising from problematic characteristics of element-attached APIs are now discussed. For instrumenting APIs directly attached to a DOM node, no single global reference to an API exists as each individual DOM element exposes the API to the calling code.

Accordingly, in this case embodiments leverage JavaScript's prototype-based object oriented features. Specifically, all DOM nodes are decedents of JavaScript's Element object class. Thus, via altering Element's prototype, embodiments are able to change the behavior of all DOM nodes transparently. FIG. 9 is a code listing showing transparent instrumentation of element-local APIs.

For APIs existing only for a subclass of DOM nodes, the respective prototype has to be instrumented. An example is the createContextualFragment API of range elements.

Instrumentation of DOM properties is now discussed. As a threshold matter it is noted that DOM properties cannot be instrumented directly. Instead, their set property has to be replaced with the safe wrapper.

As the DOM properties themselves are again attached to individual DOM nodes, embodiments change the elements' prototype. This is similar to the above approach for element-local APIs.

Accordingly, embodiments temporarily restore the original functionality. This is accomplished by:
   temporarily restoring the prototype to its original state,
   assigning the property, and afterward
   re-instrumenting the property's set function.

FIG. 10 is a code listing showing transparent instrumentation of JavaScript's innerHTML property affecting the whole document, providing implementation details.

Unsafe API and property variants are now described. As discussed above, embodiments implement measures creating API variants that are secure by default. Thus if no script-reenabling steps are taken, it is impossible to introduce additional JavaScript content into the web document.

However, $1^{st}$ party code occasionally requires this capability in order to allow the application to function properly. One method adopted by embodiments to provide this functional requirement, is to introduce potentially unsafe API/property variants.

In this case, the majority of the application code uses the standard—now safe—APIs/properties. Only in selected cases (in which the introduction of further script code is explicitly intended) is a second, newly introduced variant of the API/property called, which allows the potentially unsafe action.

In practice, the occurrence of such cases is most likely seldom and can be audited thoroughly. For example 3rd party scripts won't use the unsafe variants, as they are designed and implemented for standard browser functionality, and thus are safe.

Unsafe API variants are discussed first. To introduce an unsafe API, in addition to the API wrapper replacing the reference to the original implementation, a second API reference is introduced to the same scope (e.g., to the global document). FIG. 11 is a code listing showing an unsafe global API variant.

Unsafe properties are now discussed. In the case of DOM properties, additional properties are added to the respective element's prototypes. FIG. 12 is a code listing showing introduction of an unsafe innerHTML property variant and providing implementation details.

Details regarding the dynamic API value handling are now provided. As mentioned above, ScriptProtect allows fully transparent protection without required code changes.

Every time a value is passed to a potentially harmful API or DOM property, the wrapper first inspects the stacktrace of the current execution threat to obtain the top-most item. Depending on the applied policy (whitelist or blacklist, see below), the wrapper either automatically sanitizes the value or passes it to the API unaltered.

Stack-inspection based API access control is now discussed. JavaScript allows two distinct methods to obtain the stacktraces of the current execution threat.

First, in modern browsers the Error object exposes a property called stack. This contains a representation of the full stacktrace. FIG. 13 is a code listing illustrating the getting the current stacktrace.

Second, in browsers that do not support the Error-object based method, the trace can be retrieved iteratively through walking up the chain: arguments.callee.caller. This is the backward compatible method for older browsers.

Once the stacktrace has been obtained, the name of the top-most function is retrieved. Based on the name of the function, the mechanism evaluates if the call to the API was caused by trusted 1st party JavaScript code or untrusted 3rd party JavaScript code. This can be done either through white- or black-listing of function names.

According to embodiments, a pre-fix whitelist could be employed as follows. Where all 1st party code has been properly namespaces, an effective function-name pre-fix whitelisting can be applied. For example, all functions in SAP's UI library UI5 are within the namespace: sap.*. Thus, through only allowing functions within this namespace to alter the DOM, all other 3rd party functions are secured automatically. FIG. 14 is a code listing of pre-fix whitelisting of SAP UI5 functions.

According to embodiments, a static whitelist could be employed as follows. If no namespaces have been used by the 1st party code, but the set of trusted functions is known, a static whitelist can be used instead.

Where a list of trusted functions is unknown at first, it can be generated using a training as follows.
1. Create version of the application without 3rd party scripts.
2. Alter the ScriptProtect API wrappers, so that they log the top-most function of all calling stacktraces.
3. Add all unique function names obtained this way into the whitelist.
4. Run the application and interact with it as long as new entries are added to the trained whitelist. Terminate, when the list does not grow anymore.

The resulting list of function names can be used as the whitelist for the mechanism. FIG. 15 is a code listing of whitelisting functions.

Embodiments may also employ a blacklist. In particular if the namespace or function names of the 3rd party scripts are known, rather than a whitelist a blacklist-based approach can be used.

In this case, every time a guarded function is called from a blacklisted function, the value is sanitized before processing. While feasible, this method is dependent upon the nature of 3rd party scripts. There may be no reliable guarantee that provided 3rd party JavaScript code does not change over time and, thus new non-blacklisted functions are introduced.

Productive deployment of ScriptProtect can be relatively easy, non-intrusive and straightforward. Only the following three static files may need to be added to the Web application's resources.

A first added file is: scriptprotector.js. This is the JavaScript code that instruments the potentially problematic APIs and DOM properties. This script is static and application independent.

A second added file is: policy.json. This is the application specific configuration file, containing the application specific whitelist or blacklist policy. This configuration is retrieved from the scriptprotector.js code at the first time of initialization and subsequently cached in the browser's local Storage.

A third added file is: sanitizer.js. this is a JavaScript implementation of robust value sanitizing. As mentioned above, particular embodiments may utilize the DOMPurify2 library for this purpose.

Through inclusion of the scriptprotector.js and sanitizer.js scripts into the head portion of the web document, protection is instantiated without the need of further code changes. FIG. 16 is a code listing illustrating deployment of an embodiment.

Figure 17:
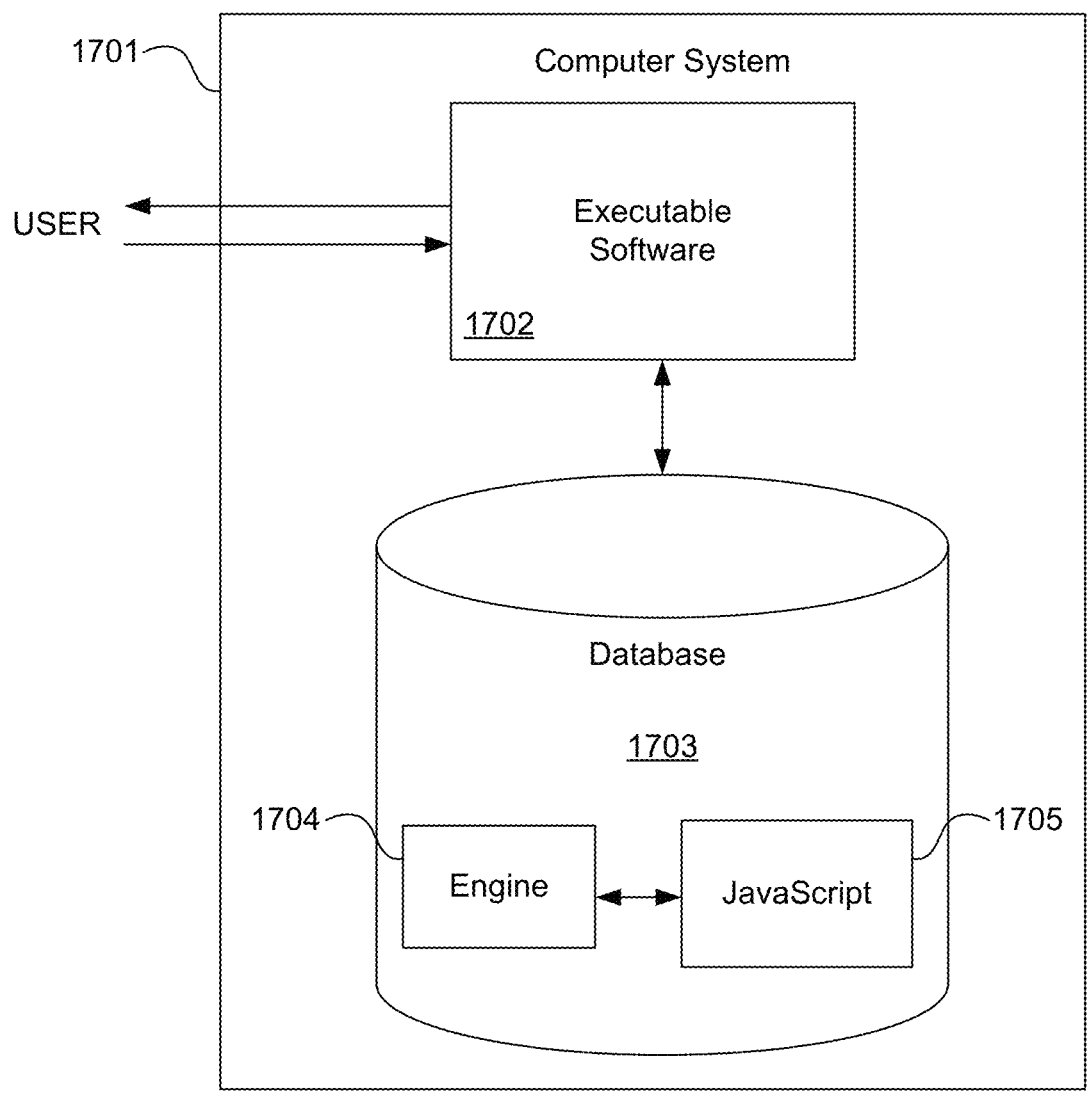
FIG. 17 illustrates hardware of a special purpose computing machine according to an embodiment that is configured to implement protection against $3^{rd}$ party JavaScript vulnerabilities.

Certain embodiments may be implemented in connection with an in-memory database, with the in-memory database engine responsible for performing one or more actions implementing protection against third party JavaScript vulnerabilities. FIG. 17 illustrates hardware of a special purpose computing machine configured to implement security according to an embodiment. In particular, computer system 1701 comprises a processor 1702 that is in electronic communication with a non-transitory computer-readable storage medium comprising a database 1703. This computer-readable storage medium has stored thereon code 1705 corresponding to JavaScript. Code 1704 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 18:
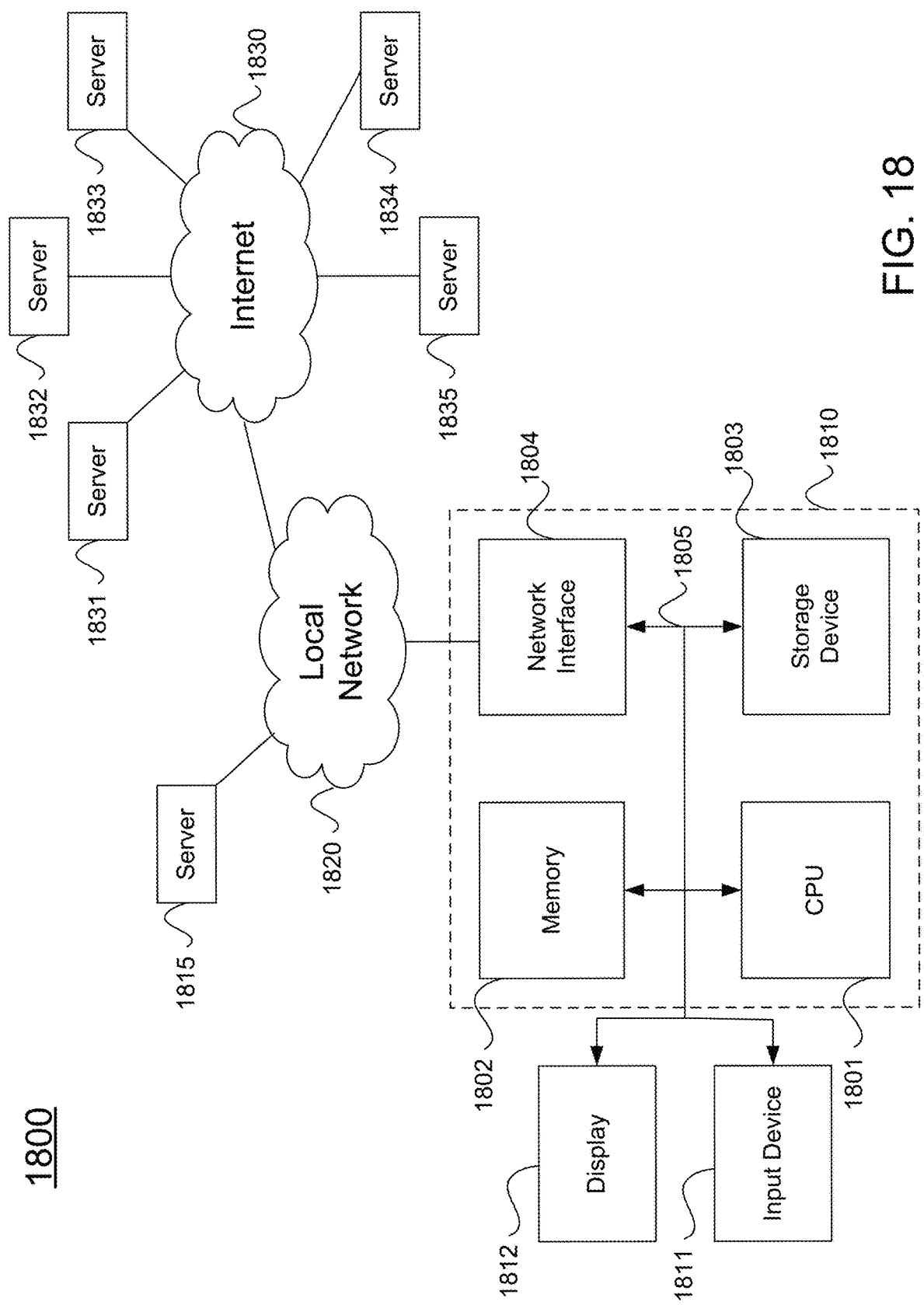
FIG. 18 illustrates an example computer system.

An example computer system 1800 is illustrated in FIG. 18. Computer system 1810 includes a bus 1805 or other communication mechanism for communicating information, and a processor 1801 coupled with bus 1805 for processing information. Computer system 1810 also includes a memory 1802 coupled to bus 1805 for storing information and instructions to be executed by processor 1801, including information and instructions for performing the techniques described above, for example. This memory may also be used for storing variables or other intermediate information during execution of instructions to be executed by processor 1801. Possible implementations of this memory may be, but are not limited to, random access memory (RAM), read only memory (ROM), or both. A storage device 1803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1803 may include source code, binary code, or software files for performing the techniques above, for example. Storage device and memory are both examples of computer readable mediums.

Computer system 1810 may be coupled via bus 1805 to a display 1812, such as a cathode ray tube (CRT) or liquid crystal display (LCD), for displaying information to a computer user. An input device 1811 such as a keyboard and/or mouse is coupled to bus 1805 for communicating information and command selections from the user to processor 1801. The combination of these components allows the user to communicate with the system. In some systems, bus 1805 may be divided into multiple specialized buses.

Computer system 1810 also includes a network interface 1804 coupled with bus 1805. Network interface 1804 may provide two-way data communication between computer system 1810 and the local network 1820. The network interface 1804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1804 sends and receives electrical, electromagnetic, or optical signals that carry digital data streams representing various types of information.

Computer system 1810 can send and receive information, including messages or other interface actions, through the network interface 1804 across a local network 1820, an Intranet, or the Internet 1830. For a local network, computer system 1810 may communicate with a plurality of other computer machines, such as server 1815. Accordingly, computer system 1810 and server computer systems represented by server 1815 may form a cloud computing network, which may be programmed with processes described herein. In the Internet example, software components or services may reside on multiple different computer systems 1810 or servers 1831-1835 across the network. The processes described above may be implemented on one or more servers, for example. A server 1831 may transmit actions or messages from one component, through Internet 1830, local network 1820, and network interface 1804 to a component on computer system 1810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    a browser receiving from a server, a document including a first JavaScript;
    the browser referencing a list stored in a database to recognize the first JavaScript as originating from other than the server;
    the browser referencing a second JavaScript for instrumenting a document object model (DOM) feature to sanitize the first JavaScript, said instrumenting comprises altering a prototype of the DOM node element;
    the browser causing the DOM feature to sanitize the first JavaScript;
    the browser temporarily restoring the prototype to its original state;
    the browser assigning an original functionality to the DOM element node;
    the browser reinstrumenting the DOM feature to sanitize the first JavaScript; and
    the browser passing a sanitized JavaScript to the document for execution.

2. A method as in claim 1 wherein the DOM feature comprises an application program interface (API).

3. A method as in claim 2 wherein the API comprises a global API, and the instrumenting comprises:
    before calling an original functionality of the first JavaScript, overwriting a global reference in the first JavaScript with a replacement reference to a sanitization function.

4. A method as in claim 3 further comprising the browser adding another reference to the global API.

5. A method as in claim 2 wherein the API comprises a local API attached to a DOM node element.

6. A method as in claim 1 wherein the DOM feature comprises a property of a DOM node element.

7. A method as in claim 6 further comprising the browser adding properties to the prototype.

8. A method as in claim 1 further comprising the browser obtaining a stacktrace to recognize the first JavaScript as originating from other than the server.

9. A method as in claim 1 wherein the list comprises a whitelist.

10. A non-transitory computer readable storage medium embodying a computer program for performing a method, said method comprising:
- a browser receiving from a server, a document including a first JavaScript;
- the browser referencing a list stored in a database to recognize the first JavaScript as originating from other than the server by obtaining a stacktrace;
- the browser referencing a second JavaScript for instrumenting a document object model (DOM) feature to sanitize the first JavaScript, said instrumenting comprises altering a prototype of the DOM node element;
- the browser causing the DOM feature to sanitize the first JavaScript;
- the browser temporarily restoring the prototype to its original state;
- the browser assigning an original functionality to the DOM element node;
- the browser reinstrumenting the DOM feature to sanitize the first JavaScript; and
- the browser passing a sanitized JavaScript to the document for execution.

11. A non-transitory computer readable storage medium as in claim 10 wherein the DOM feature comprises an application program interface (API).

12. A non-transitory computer readable storage medium as in claim 11 wherein the API comprises a global API, and the instrumenting comprises:
- before calling an original functionality of the first JavaScript, overwriting a global reference in the first JavaScript with a replacement reference to a sanitization function.

13. A non-transitory computer readable storage medium as in claim 11 wherein the API comprises a local API attached to a DOM node element.

14. A non-transitory computer readable storage medium as in claim 11 wherein the DOM feature comprises a property of a DOM node element.

15. A computer system comprising:
- one or more processors;
- a software program, executable on said computer system, the software program configured to cause an in-memory database engine to cause:
- a browser to receive from a server, a document including a first JavaScript;
- the browser to reference a list stored in an in-memory database to recognize the first JavaScript as originating from other than the server;
- the browser to reference a second JavaScript for instrumenting a document object model (DOM) feature to sanitize the first JavaScript, said instrumenting comprises altering a prototype of the DOM node element;
- the browser to cause the DOM feature to sanitize the first JavaScript;
- the browser temporarily restoring the prototype to its original state;
- the browser assigning an original functionality to the DOM element node;
- the browser reinstrumenting the DOM feature to sanitize the first JavaScript; and
- the browser to pass a sanitized JavaScript to the document for execution.

16. A computer system as in claim 15 wherein in response to the browser receiving the second JavaScript, the software program is further configured to cause the in-memory database engine to store the second JavaScript in the in-memory database.

17. A computer system as in claim 15 wherein the DOM feature comprises a global API, and the instrumenting comprises:
- before calling an original functionality of the first JavaScript, overwriting a global reference in the first JavaScript with a replacement reference to a sanitization function.

18. A computer system as in claim 15 wherein the DOM feature comprises a local API attached to a DOM node element.

19. A computer system as in claim 15 wherein the DOM feature comprises a property of a DOM node element.

* * * * *